(12) United States Patent
Cavalcanti

(10) Patent No.: US 9,402,269 B2
(45) Date of Patent: Jul. 26, 2016

(54) SIMPLIFIED BEACONING AND CHANNEL RESERVATION TECHNIQUES FOR SHORT RANGE WIRELESS NETWORKS

(75) Inventor: Dave A. T. Cavalcanti, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 745 days.

(21) Appl. No.: 12/747,572

(22) PCT Filed: Dec. 24, 2008

(86) PCT No.: PCT/IB2008/055535
§ 371 (c)(1),
(2), (4) Date: Jun. 11, 2010

(87) PCT Pub. No.: WO2009/083917
PCT Pub. Date: Jul. 9, 2009

(65) Prior Publication Data
US 2010/0272076 A1 Oct. 28, 2010

Related U.S. Application Data

(60) Provisional application No. 61/017,000, filed on Dec. 27, 2007.

(51) Int. Cl.
*H04B 7/212* (2006.01)
*H04W 74/08* (2009.01)
(Continued)

(52) U.S. Cl.
CPC ............ *H04W 74/08* (2013.01); *H04W 74/004* (2013.01); *H04W 74/0875* (2013.01); *H04W 84/12* (2013.01)

(58) Field of Classification Search
CPC .............. H04W 74/004; H04W 74/08; H04W 74/0875; H04W 84/12
USPC .......... 370/329, 336, 322; 455/450–455, 464, 455/509
See application file for complete search history.

(56) References Cited

U.S. PATENT DOCUMENTS

2004/0253996 A1 12/2004 Chen
2005/0237964 A1* 10/2005 Kupershmidt ................ 370/321
(Continued)

FOREIGN PATENT DOCUMENTS

CN 1918859 A 2/2007
WO WO2005088915 A1 9/2005

OTHER PUBLICATIONS

Guido R Hiertz et al., "Mesh Networks Alliance (MNA) Proposal IEEE 802.11s—MAC Sublayer functional Description IEEE 802.11s—Mesh WLAN Security" Internet Citation, [Online] XP0079Q1169 URL : http ://www.i eee802.org/11/DocF iles/05/11-05-0605-02-000s-mesh-networks-alliance-proposal .doc>.
(Continued)

*Primary Examiner* — Mang Yeung
(74) *Attorney, Agent, or Firm* — Larry Liberchuk

(57) ABSTRACT

A system and method for wireless BANs and short-range wireless networks that support heterogeneous devices and applications are disclosed. In one example embodiment, a method of implementing a MAC superframe structure for short-range wireless networks includes transmitting multiple beacon slots (102) during a beacon period (404) wherein the multiple beacon slots (102) include one or more simplified beacon slots associated with one or more simple devices (102), and transmitting payload data during a data transfer period (410) substantially following the beacon period (404) and wherein the data transfer period (410) includes one or more RCA periods (412) associated with the one or more simple devices (102) for transmitting and/or receiving the payload data associated with the one or more simple devices (102) upon receipt of the indication that the RCA period (412) is present in the one or more simplified beacon slots associated with the simple devices (102).

13 Claims, 5 Drawing Sheets

(51) Int. Cl.
*H04W 74/00* (2009.01)
*H04W 84/12* (2009.01)

(56) References Cited

U.S. PATENT DOCUMENTS

| | | | |
|---|---|---|---|
| 2006/0176860 A1* | 8/2006 | Marin et al. | 370/337 |
| 2006/0198335 A1 | 9/2006 | Reunamaki | |
| 2006/0268891 A1* | 11/2006 | Heidari-Bateni . | H04W 52/0216 370/395.4 |
| 2007/0042795 A1* | 2/2007 | Mo et al. | 455/502 |
| 2007/0189244 A1* | 8/2007 | del Prado Pavon et al. | 370/338 |
| 2007/0260801 A1* | 11/2007 | Kwak et al. | 710/305 |
| 2008/0013636 A1* | 1/2008 | Wang | 375/259 |

OTHER PUBLICATIONS

Guido R. Hiertz et al., "IEEE 802.15.3a Wireless Personal Area Networks—The MBOA Approach", In Proceedings of 11th European Wireless Conference 2005, vol. 1, pp. 204-210, Nicosia, Cyprus.

Jang B.M. et al., "Bio-MAC: Optimal MAC Protocol for Various Bio-Signal Transmission in the WBSN Environment", ICS '07 Information and Control Symposium paper book, pp. 423-425.

* cited by examiner

SIMPLIFIED BEACONING AND CHANNEL RESERVATION TECHNIQUES FOR SHORT RANGE WIRELESS NETWORKS

The present invention relates generally to packet transmission for wireless networks, and in particular, to a system and method for packet transmission for short-range wireless networks that support devices in and around a body.

The upcoming wireless standard for Body Area Networks (BANs) is expected to enable a range of healthcare and lifestyle applications for devices to be placed in and around a body. In BANs, complex devices with distinct requirements of Quality of Service (QoS) and power, for example, multimedia audio/video devices must co-exist and efficiently share a wireless channel through a distributed medium access control (MAC) protocol with simpler devices, such as sensors used in healthcare and fitness applications. The ultra-wideband (UWB) based standard defined by the WiMedia Alliance is a strong candidate to form the basis of a new MAC and physical layer (PHY) standard for BANs.

However, the WiMedia standard is designed for high-speed applications, such as high-quality short-range video and fast data transfer. In particular, in the MAC layer protocol specified in the WiMedia standard, all devices are assumed to have similar capabilities, whereas in the next generation BANs, some devices may be much simpler than others and they may not be able to implement all required capabilities in the existing MAC layer protocols. For example, implantable body sensors used to monitor physiological signs and/or vital organs are simpler devices. These devices generally may not implement all the required capabilities in the WiMedia MAC protocol used for high-speed data and multimedia applications, such as sending regular beacon frames, which can consume significantly more power. Further, these simpler devices may require higher reliability than complex devices in the same BAN, such as wireless head-sets, wearable mp3players, and the like. Therefore, currently the simpler and complex devices cannot co-exist and share the same wireless channel efficiently using existing distributed MAC protocols.

In addition, other MAC layer protocols designed for low-power and low-speed applications, such as the IEEE 802.15.4 and Bluetooth, do not provide the guaranteed QoS required by several multi-media applications as well as other critical applications (e.g. healthcare monitoring applications and so on) in the same BANs.

Example embodiments are illustrated by way of example and not limitation in the figures of the accompanying drawings, in which like references indicate similar elements and in which.

Other features of the present embodiments will be apparent from the accompanying drawings and from the detailed description that follows.

A system and method for implementing a MAC superframe structure for short-range wireless networks that support heterogeneous devices and applications is disclosed. In the following description, for purposes of explanation, numerous specific details are set forth in order to provide a thorough understanding of the various embodiments. It will be evident, however, to one skilled in the art that the various embodiments may be practiced without these specific details.

The terms "low-complexity devices" and "simple devices" are used interchangeably throughout the document. The terms "complex devices" and "non-simple devices" are also used interchangeably throughout the document. The terms "superframe", "superframe format" and "superframe structure" are also used interchangeably throughout the document. Further, the term "short-range wireless networks" refers to wireless personal area networks (WPANs), body area networks (BANs) and the like. Furthermore, the terms "superframe format" and "superframe structure" are used interchangeably throughout the document.

Before describing the present invention in detail, it is first helpful to describe the environments in which the present invention may be used. Accordingly, FIGS. 1 and 2 are exemplary diagrams depicting operations environments.

Figure 1:
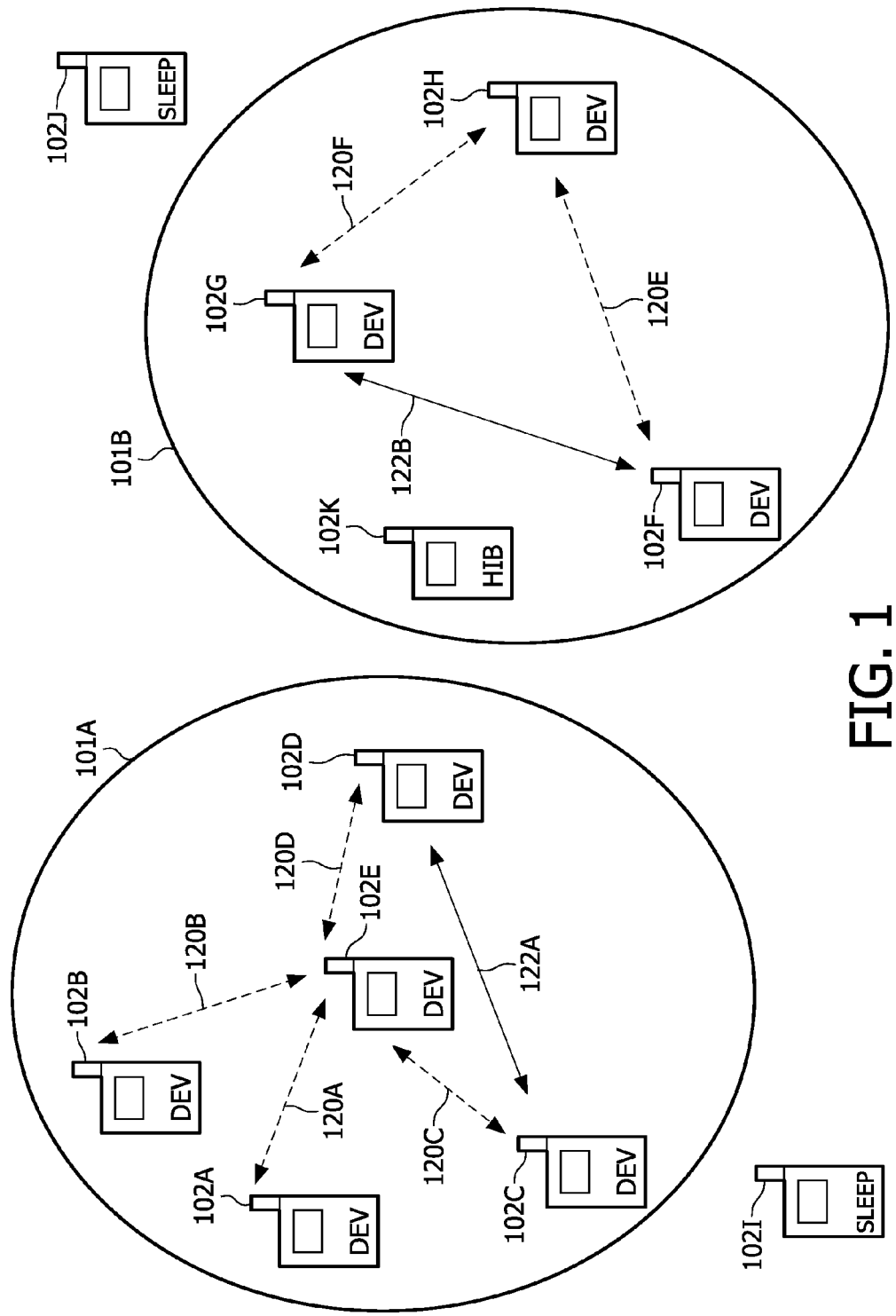
FIG. 1 is a diagram of an exemplary operational environment.
Figure 2:
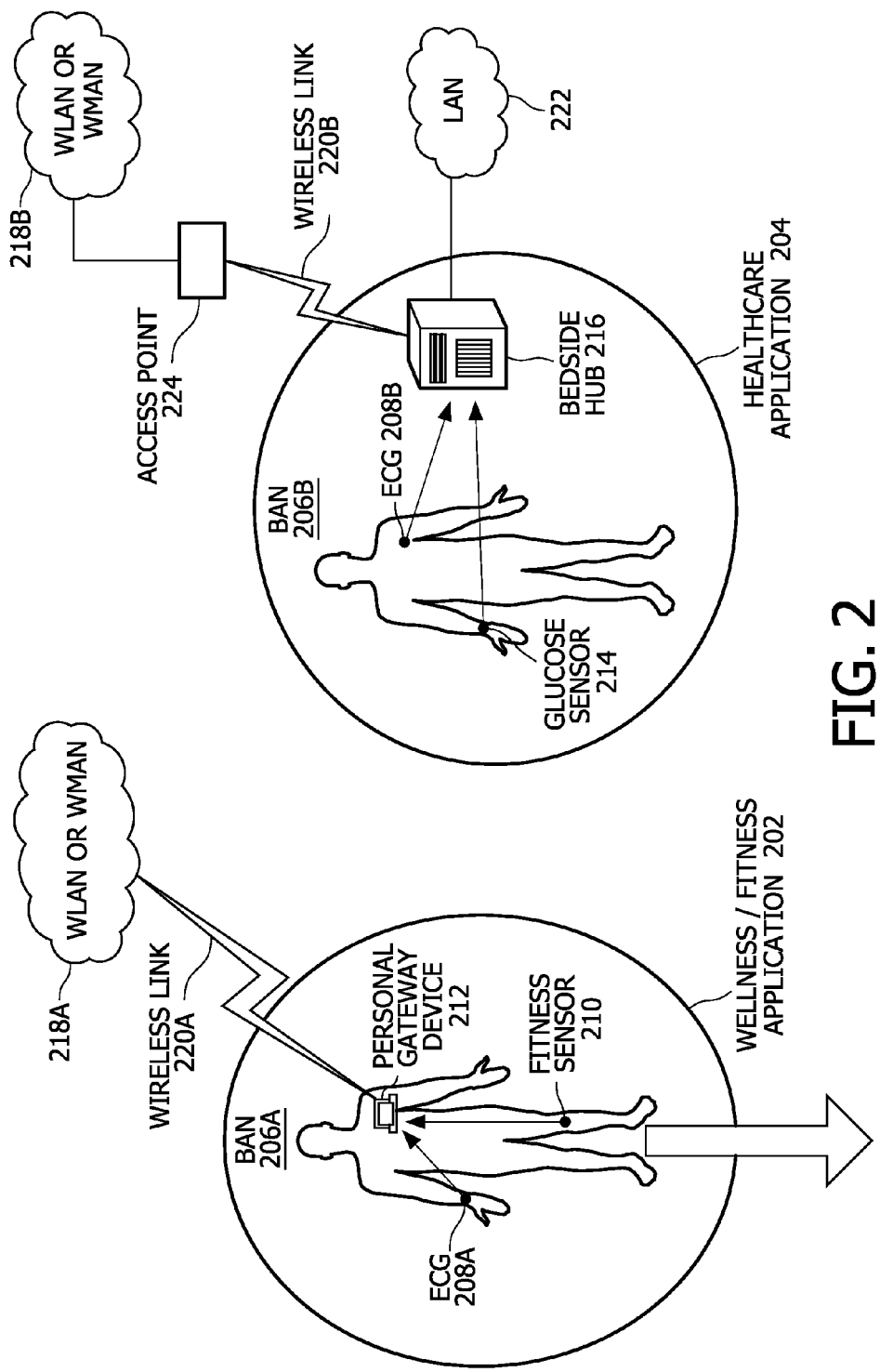
FIG. 2 is another diagram of an exemplary operation environment in the context of the invention.

FIG. 1 is a diagram of one exemplary operational environment 100. This environment includes multiple beaconing groups 101, each having a plurality of devices 102. For instance, FIG. 1 shows a beaconing group 101A, which includes member devices (DEVs) 102A-E. FIG. 1 also shows a beaconing group 101B, which includes DEVs 102F-K (device 102K is shown operating in a hibernating mode). Each of the beaconing groups 101 can form a short-range wireless network, such as WPAN, BAN and so on.

In the beaconing group 101A, each of the DEVs 102A-D may communicate with the DEV 102E across a corresponding link 120. For example, FIG. 1 shows the DEV 102A communicating with the DEV 102E across a link 120A. In addition, in the beaconing group 101A, each of the devices 102A-E may communicate with each other directly. For instance, FIG. 1 shows the DEVs 102C and 102D communicating via a direct link 122A.

In the beaconing group 101B, each of the DEVs 102F and 102G may communicate with the DEV 102H across a corresponding link 120. For example, the DEV 102F communicates with the DEV 102H across a link 120E, while the DEV 102G communicates with the DEV 102H across a link 120F, and so on. The DEVs 102F and 102G in the beaconing group 101B may also communicate with each other. For example, FIG. 1 shows the DEVs 102F and 102G communicating across a link 122B.

Each of the links 122 and 120 may employ various frequency hopping patterns or frequency channels. These patterns may include, for example, Time Frequency Codes (TFCs). In some embodiments of the present invention, each beaconing group may employ a particular frequency hopping pattern. These patterns may either be the same or different. In some embodiments, the DEVs 102A-H can use any other physical layer (PHY) transmission technique to transceive in a given channel (frequency band) or across multiple channels. Exemplary PHY includes Orthogonal Frequency Division Multiplexing (OFDM) and so on.

In addition, FIG. 1 also shows devices 102I and 102J, which are operating in a sleep mode. However, according to embodiments of the present invention, devices within the beaconing groups 101A and 101B may activate these devices in sleep mode through transmissions using the same PHY technique used for data communication, using another PHY technique and/or using another "wake-up" radio signal. In one embodiment, the simple and complex devices may use different PHY techniques to share the same frequency channel. In another embodiment, the simple and complex devices may use the same PHY technique to share the same frequency channel.

Figure 3:
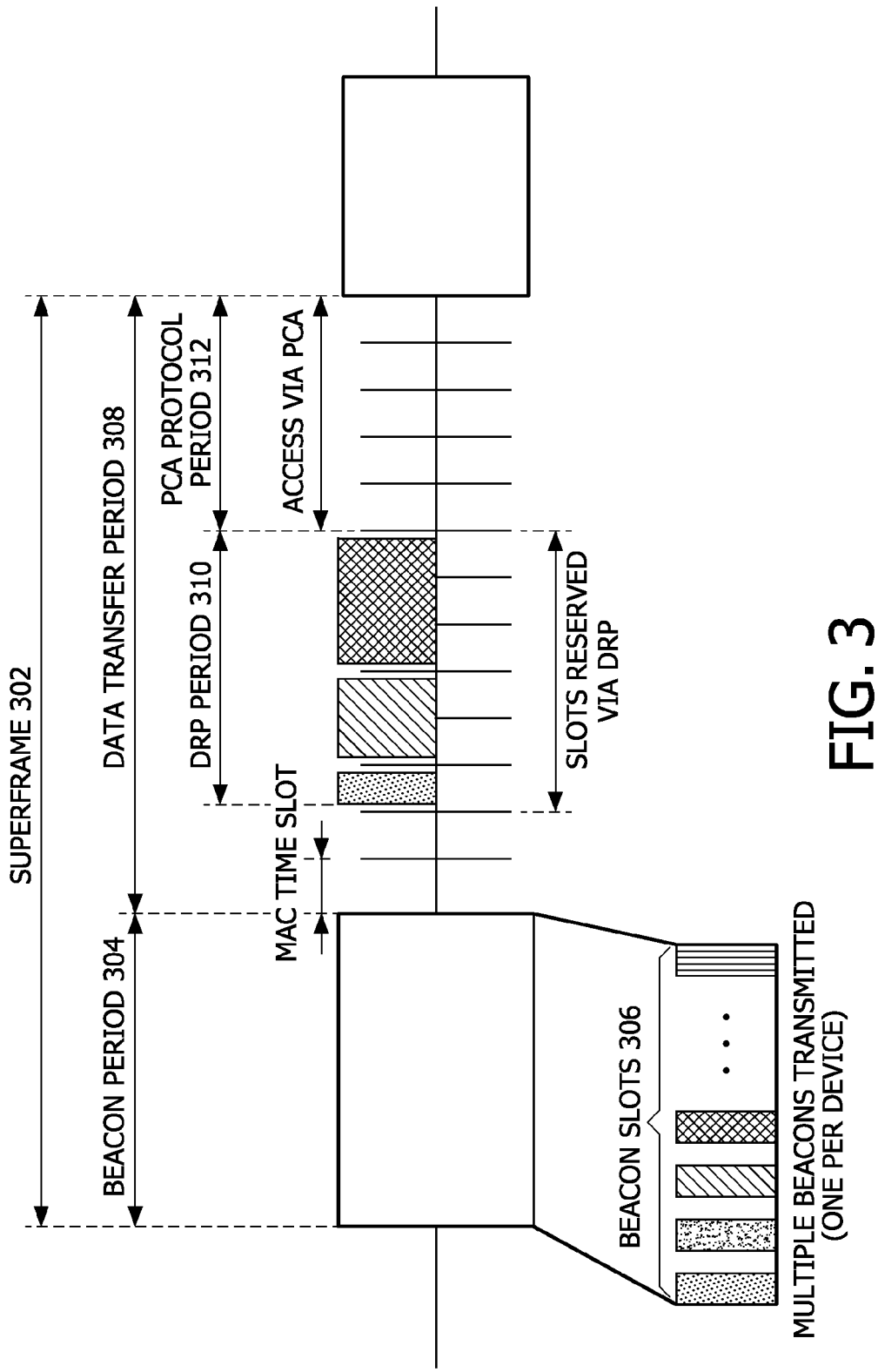
FIG. 3 illustrates a typical MAC superframe format including beacon and data transfer periods in the context of the invention.
Figure 4:
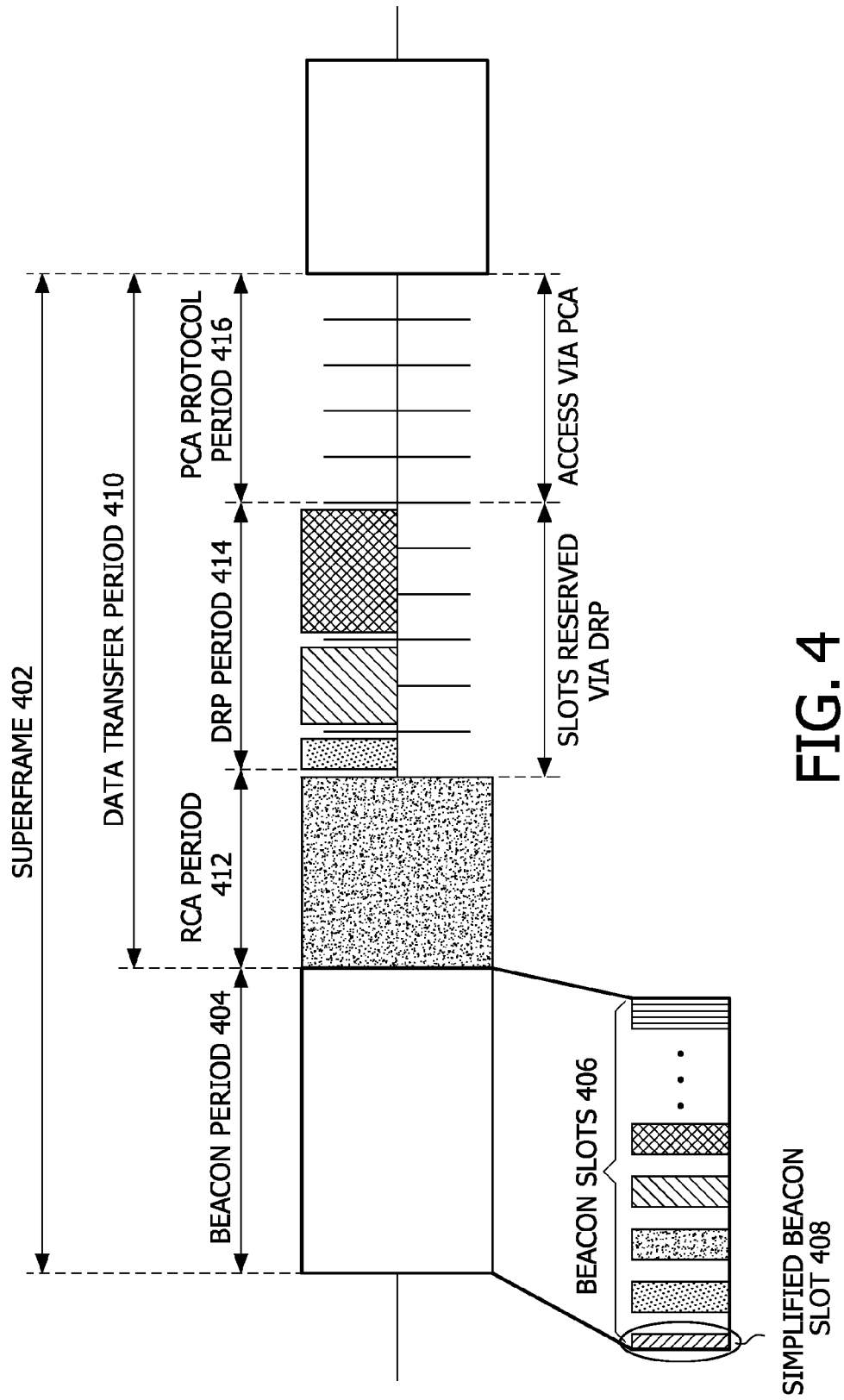
FIG. 4 illustrates an example MAC superframe format including a beacon period, an RCA period, a data transfer period and simplified beacon slots within the beacon period in accordance with an embodiment of the invention.

Transmissions of the beaconing groups 101A and 101B are each based on a repeating pattern called a media access control (MAC) superframe structure. Accordingly, FIGS. 3 and 4 illustrate a typical MAC superframe format 302 including a beacon period 304 and a data transfer period 308 and an example MAC superframe format 402 including a beacon period 404, an RCA period 412 and a data transfer period 410, respectively. It can be seen in FIG. 3 that each MAC superframe 302 is having the beacon period 304 and the data transfer period 308.

The data transfer period 308 includes a distributed reservation protocol (DRP) period 310 and a prioritized contention access (PCA) protocol period 312. In addition, channel time for data communication can be reserved through the DRP period 310. Further, during the PCA protocol period 312, the devices can contend for the channel access. Also, it can be seen in FIG. 4 that each MAC superframe 402 has a beacon period 404 including multiple beacon slots 406 with at least one simplified beacon slot 408 and a data transfer period 410 substantially following the beacon period 404. Generally, each MAC superframe 402 consists of 256 media access slots (MASs), and nearly n MASs are used for the beacon period 404 and the rest are used during the data transfer period 410.

Each beacon period 404 conveys transmission from each of the active devices in the beaconing group 101. Further, each beacon period 404 enables device discovery, sleep mode operation and such other functions. Furthermore, each beacon period 404 is used to announce reservations. Generally, all active devices listen to all associated beacons within the beaconing group 101. Therefore, these active devices learn from their neighbors about blocked MASs to be reserved. Accordingly, each beacon period 404 includes multiple beacon slots 406. Each beacon slot corresponds to a particular device 102 in the beaconing group 101. During the beacon period 404, the associated devices may transmit various overhead or networking control/management information. The simplified beacon slot 408 is a slot used by a selected device to transmit a simplified beacon on behalf of all simple devices (or a subset of simple devices) within the beaconing group 101. In some embodiments, the selected device used for transmitting the simplified beacon can be either a simple device or a complex device. The simplified beacon indicates the presence of simple devices without requiring the simple device to transmit beacons. In these embodiments, only one device can be selected to transmit the simplified beacon slot 408, which could also be one of the complex devices in BAN (e.g., the BAN 206A of FIG. 2) or any other device capable of sending beacons.

For instance, such information may be used to set resource allocations and to communicate management information for the beaconing group 101. In addition, according to the present invention, each data transfer period 410 may be used to transmit applications' data, which can include data such as multimedia data, voice data, video data, healthcare monitoring data and so on.

FIG. 4 further illustrates the MAC superframe 402 having a reserved channel access (RCA) period 412 within the data transfer period 410 allocated for use by simple devices. RCAs are hard or private type reservations (with highest priority). This prevents other non-simpler devices (i.e., complex devices) from performing data communication within the RCA period 412 or using the RCA period 412 within the MAC superframe 402 for any other purposes that may interfere with data transmissions and receptions performed by the simple devices within the RCA period 412.

Accordingly, the simple devices associated with the RCAs use the corresponding RCA periods 412 with the MAC superframe 402 for communicating with any other compatible device within its communication range. The RCAs are repeated in beacons during every MAC superframe 402 for as long as desired to be valid. The presence of the RCA period 412 is signaled by a selected device in the simplified beacon slot 408 and/or any other beacon slot 406 within the beacon period 404 corresponding to a device that is allowed to make the reservation of the RCA period 412.

FIG. 2 is another diagram of one exemplary operational environment in the context of the invention. It can be seen that the above technique described with reference to FIG. 1 is being used in Wellness/Fitness application 202 and/or Healthcare application 204. It can be envisioned that the above technique can be extended to any short-range wireless networks.

FIG. 2 shows BANs 206A-B including body area sensors (devices), such as an electro-cardiogram (ECG) 208A-B, a fitness sensor 210 and/or a glucose sensor 214 communicating with a portable/personal device (e.g. gateway) 212 or fixed hub (e.g. patient monitor or bedside hub 216), that processes information locally and/or forward the information to a service processing center through any external network connection, which could be a Wireless Local Area Network (WLAN), cellular network, wired network and/or a Wireless Metropolitan Area Network (WMAN) 218.

In operation, the BAN devices share a wireless channel to exchange data. In one example, the body sensors (i.e. ECG 208A and fitness sensor 210) send monitoring data to the personal gateway device 212 carried by the user. The personal gateway device 212 may process the information locally, display the information and/or forward the data to a service processing center through an external connection (e.g. Wireless Local Area Network (WLAN), Wireless Metropolitan Area Network (WMAN) or cellular network) by using WLAN or WMAN link 220 as illustrated in the BAN 206A. In another example, the body sensors (i.e. ECG 208B and glucose sensors 214) send monitoring data to the bedside hub 216, which can also process and display information locally or forward it to a server in another network through WLAN 218B (e.g., using access point 224) or LAN 222 as illustrated in the BAN 206B of FIG. 2.

In accordance with the above-described examples and with reference to FIG. 4, the BANs 206A-B include multiple transceivers (e.g., ECG 208, fitness sensor 210, and glucose sensor 214) that communicate via wireless links 220A-B in short-range wireless networks within a beaconing group (e.g., the beaconing group 101 of FIG. 1). In these embodiments, the multiple transceivers include one or more simple devices and each of the transceivers use the same MAC superframe structure 402 to coordinate its operation. For example, the transceivers use the MAC superframe 402 as a synchronization structure in order to operate in a coordinated way and share the channel with each other.

Further, the MAC superframe structure 402 includes a beacon period 404 which includes multiple beacon slots 406. In addition, the multiple beacon slots 406 include one or more beacon slots associated with one or more simple devices and one or more complex devices within the beaconing group 101. The MAC superframe 402 further includes a data transfer period 410 substantially following the beacon period 404.

Further, the data transfer period 410 includes one or more RCA periods 412 to be used by the one or more simple devices upon a reservation indicated in the one or more beacon slots 406 associated with the simple devices. In some embodiments, the one or more beacon slots 406 associated with the simple devices comprise one or more simplified beacon slots 408 associated with the one or more simple devices. In these embodiments, the simplified beacon slot 408 is associated with all of the one or more simple devices or a subset of the one or more simple devices in the beaconing group 101.

FIG. 3 illustrates a typical WiMedia MAC superframe format 302 including beacon period 304 and data transfer period 308 in the context of the invention. As illustrated in FIG. 3, the MAC superframe format 302 includes the beacon period 304 including beacon slots 306 and the data transfer period 308 (including a DRP period 310 and a PCA protocol period 312). Further during the beacon period 304, multiple devices transmit multiple beacons, each device transmitting one beacon.

UWB WiMedia MAC may be used as basis for a MAC/PHY standard for the BAN 206. Under this arrangement, low complexity devices and complex devices are assumed to have similar capabilities. However, the low complexity devices (e.g., biosensors, implantable sensors, etc.) and the complex devices (e.g., wireless head-sets, wearable mp3 players, etc.) may not have similar capabilities (e.g., quality of service (QoS) and power requirements). Hence, in the BANs 206A-B (e.g., including the low complexity devices and the complex devices), the low complexity devices may not be able to implement all required capabilities in the WiMedia MAC.

For example, the low complexity devices such as implantable body sensors (e.g., the ECG 208, the fitness sensor 210, and the glucose sensor 214), used to monitor physiological signs and/or vital organs may have higher reliability requirements than the complex devices. Further, as all devices 102 (e.g., complex as well as simple) are required to transmit and receive each others beacons and communicate over the same channel, the devices 102 with distinct requirements of QoS and power in the short-range wireless networks (e.g., the BANs 206A-B), fail to co-exist and efficiently share a wireless channel using a distributed MAC protocol (e.g., the UWB WiMedia MAC).

Hence, in order to overcome the above problem, the present invention involves transmitting simplified beacons (e.g., associated with one or more simple devices) to indicate that the low-complexity devices are present and to advertise reserved time for such devices within the superframe structure and to provide a reserved channel access period (RCA) within a superframe structure to be used for data transmission only by the low-complexity devices.

FIG. 4 illustrates an example MAC superframe format 402 including a beacon period 404, an RCA period 412, a data transfer period 410 and simplified beacon slots 408 within the beacon period 404 in accordance with an embodiment of the invention. As illustrated in FIG. 4, the MAC superframe format 402 includes the beacon period 404 which includes multiple beacon slots 406 and the data transfer period 410 substantially following the beacon period 404. In some embodiments, the multiple beacon slots 406 include one or more beacon slots associated with one or more simple devices (e.g., implantable body sensors, bio-sensors, etc.) and/or one or more complex devices (e.g., wireless head-sets and wearable mp3 players) within a beaconing group (e.g., the beaconing groups 101A and 102B of FIG. 1). In these embodiments, one or more beacon slots 406 associated with the simple devices include one or more simplified beacon slots 408 associated with the one or more simple devices. In one embodiment, the one or more simplified beacon slots 408 are associated with all of the one or more simple devices or a subset of the one or more simple devices in the beaconing group 101.

The data transfer period 410 includes an RCA period 412, a DRP period 414 and a PCA protocol period 416. In some embodiments, the data period 410 includes one or more RCA periods 412 that are used by the one or more simple devices upon a reservation indicated in the one or more beacon slots 406 associated with the simple devices and the complex devices. It can be noted that, a single simplified beacon slot 408 associated with the current MAC superframe 402 may be used to reserve the channel for multiple upcoming superframes in advance such that the indicated RCA period 412 associated with one of the multiple upcoming superframes is used by the associated one or more simple devices, even if the single simplified beacon slot 408 associated with the indicated RCA period 412 is not included in the multiple upcoming MAC superframes. In these embodiments, the RCA period 412 is used for data transmission either between the simple devices or between the simple devices and the complex devices. For example, the data transmission during the RCA period 412 allows the one or more simple devices to receive priority access through the RCA period 412.

During the DRP period 414, a distributed reservation protocol (DRP) announces future transmissions and thus allowing devices to coordinate their channel access. In some embodiments, the DRP provides collision free channel access. In these embodiments, media access slots (MAS) are used for access via the DRP. Further, during the PCA protocol period 416, the complex devices in the short-range wireless networks contend for the channel access. In one embodiment, the one or more simple and complex devices receive payload data during the data transfer period 410 and process the payload data. For example, processing the payload data includes buffering, decoding and demodulating of the payload data.

It can be noted from the FIG. 4 that the superframe format 402 including the simplified beacon slots 408 and the RCA period 412 enables the simple devices and the complex devices to co-exist and efficiently share a wireless channel (e.g., spectrum) through a distributed MAC protocol in the short-range wireless networks (e.g., the BANs 206A-B illustrated in FIG. 2). In addition, the above described superframe format 402 allows the simple devices to conserve power as they do not need to send or receive all beacons transmitted by complex devices. Generally, the simple devices may just "wake up" during the RCA period when they need to transmit and/or receive data. Further, the method of operation according the MAC superframe 402 is described in the following description.

Figure 5:
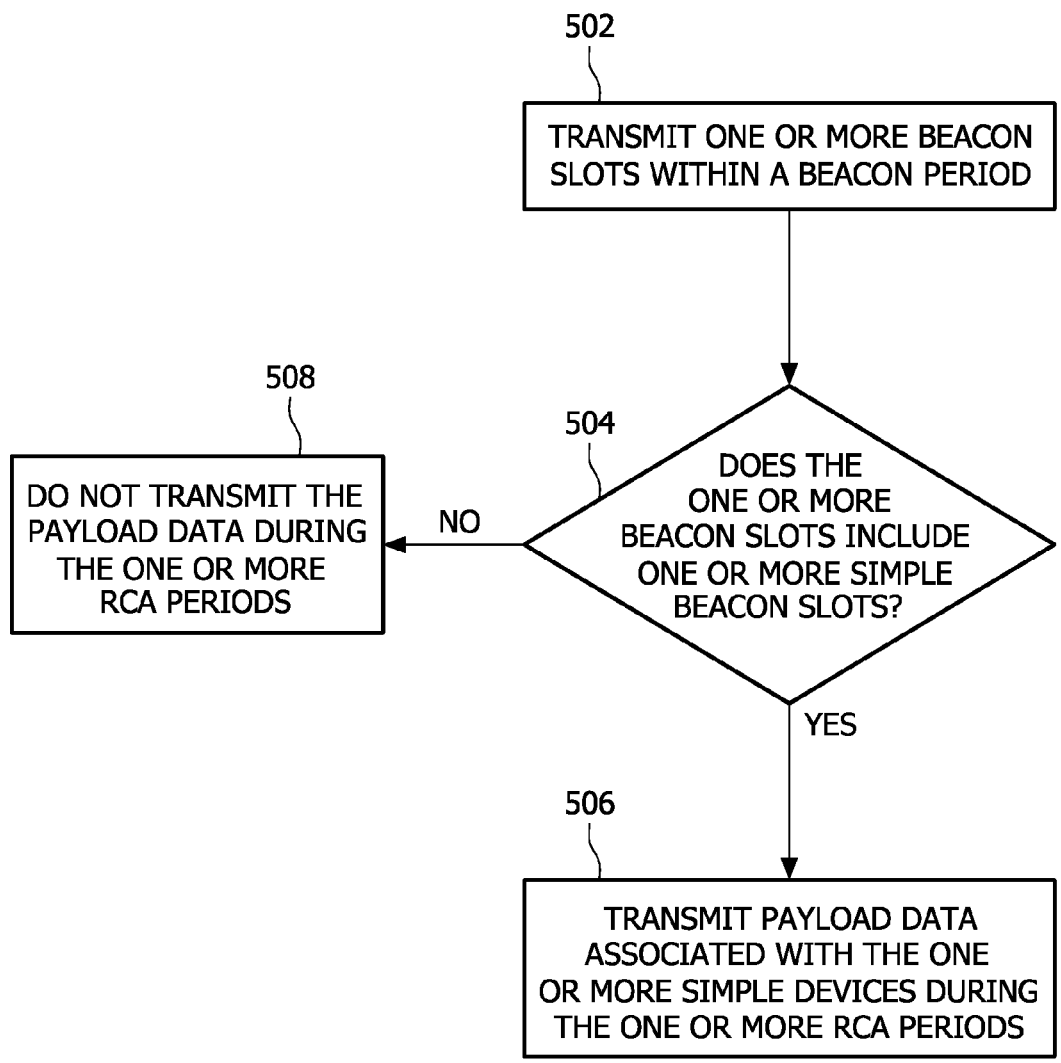
FIG. 5 is a flowchart for illustrating a first exemplary method for implementing the MAC superframe structure for short-range wireless networks, shown in FIG. 4, in accordance with an embodiment of the invention.

FIG. 5 is a flowchart for illustrating a first exemplary method for implementing the MAC superframe structure 402 for short-range wireless networks, shown in FIG. 4, in accordance with an embodiment of the invention. Particularly, the process 500 illustrates devices operation during the MAC superframe 402 for the short-range wireless networks including multiple transceivers communicating via wireless links. In one embodiment, the multiple transceivers include one or more simple devices and one or more complex devices. In operation 502, multiple beacons slots 406 are transmitted during a beacon period 404. In some embodiments, the multiple beacon slots 406 include one or more beacon slots associated with one or more simple devices and one or more complex devices. In these embodiments, the one or more beacon slots 406 associated with the one or more simple devices include one or more simplified beacon slots 408.

In some embodiments, a selected transceiver (e.g., a simple device or a complex device) transmits the one or more beacon slots 406 (e.g., including the simplified beacon slots 408) during the beacon period 404. In these embodiments, the selected transceiver transmits the one or more simplified beacon frames within the simplified beacon slots 408 using a physical layer (PHY) associated with the one or more simple devices or the one or more complex devices.

In operation 504, it is determined whether the beacon period 404 includes the one or more simplified beacon slots 408 associated with the one or more simple devices. If the beacon period 404 includes the one or more simplified beacon slots 408, then in operation 506, payload data is transmitted during a data transfer period 410 substantially following the beacon period 404. The data transfer period includes one or more RCA periods 412, a DRP period 414 and a PCA protocol period 416.

In some embodiments, the RCA period 412 is used for data transmission either between the simple devices or between the simple devices and the complex devices. In these embodiments, the RCA periods 412 associated with one or more simple devices are used for transmitting the payload data associated with the one or more simple devices upon receipt of the indication that the RCA period 412 is present in the one or more simplified beacon slots 408 associated with the one or more simple devices.

It can be noted that, in some embodiments, the simplified beacon slot 408 may indicate that a RCA period 412 is following the beacon period 404 in subsequent superframes 402 and that RCA period 412 should be used for data transmission by the one or more simple devices, even if the simplified beacon slot 408 associated with that particular RCA period 412 is not included in the subsequent superframes 402. In other words, a single simplified beacon slot 408 may be used to reserve the channel for multiple upcoming superframes 402 in advance.

In operation 508, the payload data is not transmitted during the one or more RCA periods 412 associated with the one or more simple devices if the beacon period 404 does not include the one or more simplified beacon slots 408 associated with the one or more simple devices.

The above-described technique allows low-complexity and simpler devices to share the channel more efficiently through the distributed MAC protocol and it also allows the simpler devices to conserve more energy as they are not required to send any beacons, while still capable of receiving priority access through the associated RCA periods 412. It can also be seen that the above technique can guarantee QoS within the RCA periods 412, as the expected payload during the data transfer period 410 can be small as the low-complexity devices typically generate a very low traffic load, and a simple contention-based protocols or any other medium access protocol that can provide QoS, can be used for these devices within the RCA period 412. Further, QoS can also be guaranteed within the RCA period 412, as the complex devices considers the RCA period 412 as reserved and hence the complex devices may not attempt to use the channel during the RCA period 412. In some embodiments, information associated with a beacon period in a current MAC superframe is used to coordinate operations in a current MAC superframe, next MAC superframe, and/or substantially next MAC superframe. Even though the above technique is described with reference to transmitting multiple beacon slots and payload data during a beacon period and data transfer period, respectively, and processing them, it can also be envisioned that the above technique can be also used for receiving the multiple beacon slots and payload data.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

In interpreting the appended claims, it should be understood that:
  a) the word "comprising" does not exclude the presence of other elements or acts than those listed in a given claim;
  b) the word "a" or "an" preceding an element does not exclude the presence of a plurality of such elements;
  c) any reference signs in the claims do not limit their scope;
  d) several "means" may be represented by the same item or hardware or software implemented structure or function; and
  e) each of the disclosed elements may be comprised of hardware portions (e.g., discrete electronic circuitry), software portions (e.g., computer programming), or any combination thereof.

What is claimed is:

1. A non-transitory computer readable medium with instructions stored therein which upon execution instruct at least one processor to:
  generate a MAC superframe format for a wireless network, the MAC superframe format including a reserved channel access (RCA) period that is allocated exclusively to one or more simple devices for transfer or receipt of payload data within a beaconing group, the MAC superframe further comprising a distributed reservation protocol (DRP) period and a prioritized contention access (PCA) protocol period that are accessible by devices different from the one or more simple devices for transfer or receipt of payload data;
  generate a beacon period including multiple beacon slots, the multiple beacon slots including one or more simplified beacon slots, the one or more simplified beacon slots used by a selected device to transmit a beacon on behalf of the one or more simple devices such that the beacon enables discovery of the one or more simple devices the one or more simple devices comprising sensor devices; and
  transfer or receive payload data by the one or more simple devices substantially following the beacon period using the RCA period.

2. The non-transitory computer readable medium of claim 1, wherein the beacon period further comprises one or more beacon slots associated with complex devices within the beaconing group, the complex devices each being configured to transmit beacons at a rate greater than or equal to one beacon per superframe.

3. The non-transitory computer readable medium of claim 2, wherein each RCA period is used for data transmission between devices selected from the group consisting of the simple devices and between the simple devices and the complex devices.

4. The non-transitory computer readable medium of claim 3, wherein the one or more simple devices receive payload data during the RCA period and the one or more complex devices receive payload data durinq the DRP period or the PCA protocol period, wherein processing the payload data by the one or more simple and complex devices include acts selected from the group consisting of buffering, decoding, and demodulating.

5. The non-transitory computer readable medium of claim 1, wherein the beacon period is associated with a current MAC superframe and is used to coordinate operations in a MAC superframe selected from the group consisting of current superframe, next superframe, and substantially next superframe.

6. A method of implementing a MAC superframe for wireless networks, wherein each of the wireless networks includes multiple transceivers that communicate via wireless links, and wherein the multiple transceivers include one or more simple devices, the method comprising:

transmitting multiple beacons during a beacon period including multiple beacon slots, the multiple beacon slots including one or more simplified beacon slots, the one or more simplified beacon slots used by a selected transceiver to transmit a beacon on behalf of the one or more simple devices such that the beacon enables discovery of the one or more simple devices within a beaconing group, the one or more simple devices comprising sensor devices; and transmitting payload data during a data transfer period substantially following the beacon period and wherein the data transfer period includes one or more reserved channel access (RCA) periods within the MAC superframe allocated exclusively to the one or more simple devices for transmitting the payload data associated with the one or more simple devices upon receipt of an indication in the one or more simplified beacon slots associated with the simple devices that the one or more RCA periods are present, the MAC superframe further comprising a distributed reservation protocol (DRP) period and a prioritized contention access (PCA) protocol period that are accessible by devices different from the one or more simple devices for transfer or receipt of payload data.

7. The method of claim 6, wherein the multiple transceivers further comprise one or more complex devices which are each configured to transmit beacons at a rate greater than or equal to one beacon per superframe, and wherein the beacon period further includes one or more beacon slots associated with the one or more complex devices.

8. The method of claim 7, wherein transmitting the payload data during the data transfer period substantially following the beacon period comprises:

determining whether the beacon period includes the one or more simplified beacon slots, the one or more simplified beacon slots being one or more beacon slots used by the selected transceiver to transmit the simplified beacon indicating a presence of the one or more simple devices; and if the beacon period includes the one or more simplified beacon slots, then transmitting the payload data during the data transfer period substantially following the beacon period and wherein the data transfer period includes one or more RCA periods associated with the one or more simple devices for transmitting the payload data associated with the one or more simple devices upon receipt of the indication that the RCA period is present.

9. The method of claim 7, wherein transmitting the simplified beacon frame within the simplified beacon slot by the selected transceiver comprises:

transmitting the one or more simplified beacon frames using a physical layer (PHY) associated with devices selected from the group consisting of the one or more simple devices and the one or more complex devices.

10. The method of claim 7, wherein each RCA period is used for data transmission between devices selected from the group consisting of the simple devices and between the simple devices and the complex devices.

11. The method of claim 6, wherein, in transmitting, the selected transceiver is a device selected from the group consisting of a simple device and a complex device.

12. An apparatus, comprising:

multiple transceivers that communicate via wireless links in a wireless network within a beaconing group and wherein the multiple transceivers include one or more simple devices, wherein each of the transceivers operates according a MAC superframe structure, wherein the MAC superframe structure comprises a beacon period including multiple beacon slots, wherein the multiple beacon slots include one or more simplified beacon slots, the one or more simplified beacon slots used by a selected transceiver to transmit a beacon on behalf of the one or more simple devices within the beaconing group, the simplified beacon enabling discovery of the one or more simple devices within the beaconing group, the one or more simple devices comprising sensor devices; and wherein the MAC superframe structure further comprises a data transfer period substantially following the beacon period including one or more reserved channel access (RCA) periods allocated exclusively to the one or more simple devices, the MAC superframe structure further comprising a distributed reservation protocol (DRP) period and a prioritized contention access (PCA) protocol period that are accessible by devices different from the one or more simple devices for transfer or receipt of payload data.

13. The apparatus of claim 12, wherein the beacon period further comprises one or more beacon slots associated with complex devices within the beaconing group that are each configured to transmit beacons at a rate greater than or equal to one beacon per superframe.

* * * * *